United States Patent
Bunch et al.

(10) Patent No.: US 8,144,048 B2
(45) Date of Patent: Mar. 27, 2012

(54) SYSTEMS AND METHODS FOR GAUSSIAN DECOMPOSITION OF WEATHER RADAR DATA FOR COMMUNICATION

(75) Inventors: Brian Paul Bunch, Snohomish, WA (US); James Christopher Kirk, Clarksville, MD (US); Dongsong Zeng, Germantown, MD (US)

(73) Assignee: Honeywell International Inc., Morristown, NJ (US)

( * ) Notice: Subject to any disclaimer, the term of this patent is extended or adjusted under 35 U.S.C. 154(b) by 175 days.

(21) Appl. No.: 12/731,998

(22) Filed: Mar. 25, 2010

(65) Prior Publication Data

US 2010/0245167 A1  Sep. 30, 2010

Related U.S. Application Data (60) Provisional application No. 61/163,362, filed on Mar. 25, 2009, provisional application No. 61/163,355, filed on Mar. 25, 2009, provisional application No. 61/185,086, filed on Jun. 8, 2009.

(51) Int. Cl.
*G01S 13/00* (2006.01)

(52) U.S. Cl. ............. 342/26 B; 342/26 R; 342/26 A; 342/26 C; 342/26 D (58) Field of Classification Search ............. 342/26 R, 342/26 A, 26 B, 26 C, 26 D
See application file for complete search history.

(56) References Cited

U.S. PATENT DOCUMENTS

| | | | |
|---|---|---|---|
| 4,754,282 A * | 6/1988 | Edelblute et al. | 342/417 |
| 5,410,621 A | 4/1995 | Hyatt | |
| 5,487,172 A | 1/1996 | Hyatt | |
| 5,563,604 A * | 10/1996 | Brandao et al. | 342/159 |
| H1720 H * | 4/1998 | Chen | 342/25 E |
| H1726 H * | 5/1998 | Chen | 342/93 |
| 5,831,570 A * | 11/1998 | Ammar et al. | 342/26 B |
| 6,243,483 B1 | 6/2001 | Petrou et al. | |
| 6,448,923 B1 * | 9/2002 | Zrnic et al. | 342/26 R |
| 6,577,265 B2 * | 6/2003 | Dalton et al. | 342/26 R |
| 6,591,171 B1 * | 7/2003 | Ammar et al. | 701/16 |
| 7,538,712 B2 | 5/2009 | Allen et al. | |
| 7,589,666 B2 * | 9/2009 | Passarelli et al. | 342/196 |
| 7,598,899 B2 | 10/2009 | Allen et al. | |
| 7,653,218 B1 * | 1/2010 | Malitz et al. | 382/113 |
| 7,773,029 B1 * | 8/2010 | Bachman | 342/159 |
| 7,948,438 B1 * | 5/2011 | Francis | 342/417 |
| 2002/0039072 A1 * | 4/2002 | Gremmert et al. | 340/945 |
| 2008/0001808 A1 * | 1/2008 | Passarelli et al. | 342/26 R |
| 2008/0231502 A1 | 9/2008 | Allen et al. | |
| 2008/0231503 A1 | 9/2008 | Allen et al. | |

(Continued)

OTHER PUBLICATIONS

Y.P. Ostroysky and F.J. Yanovsky, 11th Int. Conf. on Mathematical Methods in Electromagnetic Theory, Use of Neural Network for Turbulence and Precipitation Classification Procedure, Jun. 26-29, 2006, 4 Pages, Kharkiv, Ukraine.

(Continued)

*Primary Examiner* — Thomas Tarcza
*Assistant Examiner* — Peter Bythrow
(74) *Attorney, Agent, or Firm* — Lowe Graham Jones PLLC (57) ABSTRACT

Exemplary methods and systems provide for processing weather data received from a weather radar system. An exemplary embodiment receives radar reflectivity data, decomposes the received radar reflectivity data into multiple adaptive Gaussian component functions, selects at least one parameter from the decomposed Gaussian component functions, generates the compressed weather radar display data based on the at least one selected parameter, and communicates the weather radar display data from the craft.

19 Claims, 4 Drawing Sheets

U.S. PATENT DOCUMENTS

| | | |
|---|---|---|
| 2008/0231504 A1 | 9/2008 | Sartor et al. |
| 2008/0232709 A1 | 9/2008 | Rahmes et al. |
| 2008/0234981 A1 | 9/2008 | Sartor et al. |
| 2008/0234982 A1* | 9/2008 | Allen et al. ............... 702/190 |
| 2008/0303712 A1 | 12/2008 | Bruyere et al. |

OTHER PUBLICATIONS

Mario Montopoli and Frank Silvio Marzano, IEEE: Transactions on Geoscience and Remote Sensing, Maximum-Likelihood Retrieval of Modeled Convective Rainfall Patterns from Midlatitude C-Band Weather Radar Data, Jul. 2007, 14 Pages, vol. 45, No. 7.

Montopoli, M et al.; Maximum-Likelihood Retrieval of Modeled Convective Rainfall Patterns form Midlatitude C-Band Weather Radar Data, IEEE Transactions on Geoscience and Remote Sensing, IEEE Service Center, Piscataway, NJ, vol. 45, No. 7, Jul. 1, 2007.

Ostrovsky, Y P, et al.; Use of Neural Network for Turbulence and Precipitation Classification Procedure, Mathematical Methods in Electromagnetic Theory, 2006 International Conference on Kharkov, Ukraine Jun. 26-29, 2006, Piscataway, NJ, pp. 161-163.

* cited by examiner

SYSTEMS AND METHODS FOR GAUSSIAN DECOMPOSITION OF WEATHER RADAR DATA FOR COMMUNICATION

PRIORITY CLAIM

This patent application claims priority from U.S. Provisional Patent Application Ser. No. 61/185,086 filed Jun. 8, 2009, and entitled, "GAUSSIAN DECOMPOSITION OF WEATHER RADAR DATA FOR SMOOTHING AND EFFICIENT DATA LINKING," the contents of which are hereby incorporated by reference in its entirety. Further, this application claims priority from U.S. Provisional Patent Application Ser. No. 61/163,362, filed Mar. 25, 2009, and entitled, "NEURAL NETWORKS FOR TURBULENCE PREDICTIVE SYSTEMS" and U.S. Provisional Patent Application Ser. No. 61/163,355 filed Mar. 25, 2009, and entitled, "TURBULENCE PREDICTION OVER EXTENDED RANGES", the contents of which are hereby incorporated by reference.

BACKGROUND OF THE INVENTION

Currently, there is no ability for, or at least great difficulty for, a given aircraft to communicate its on-board weather radar data off the aircraft to other aircraft and/or centralized ground stations. One of the hurdles in communicating weather data acquired from an on-board weather radar system has been the fairly large bandwidth requirements necessary to communicate the large amount of weather data involved and to support the rate at which the weather data can change as the on-board weather radar system acquires new weather information.

SUMMARY OF THE INVENTION

An exemplary embodiment provides methods and systems for processing weather data received from a weather radar system. An exemplary embodiment receives radar reflectivity data, decomposes the received radar reflectivity data into multiple adaptive Gaussian component functions, selects at least one parameter from the decomposed Gaussian component functions, generates the compressed weather radar display data based on the at least one selected parameter, and communicates the weather radar display data from the craft.

BRIEF DESCRIPTION OF THE DRAWINGS

Preferred and alternative embodiments of the present invention are described in detail below with reference to the following drawings.

DETAILED DESCRIPTION OF ONE EMBODIMENT

Figure 1:
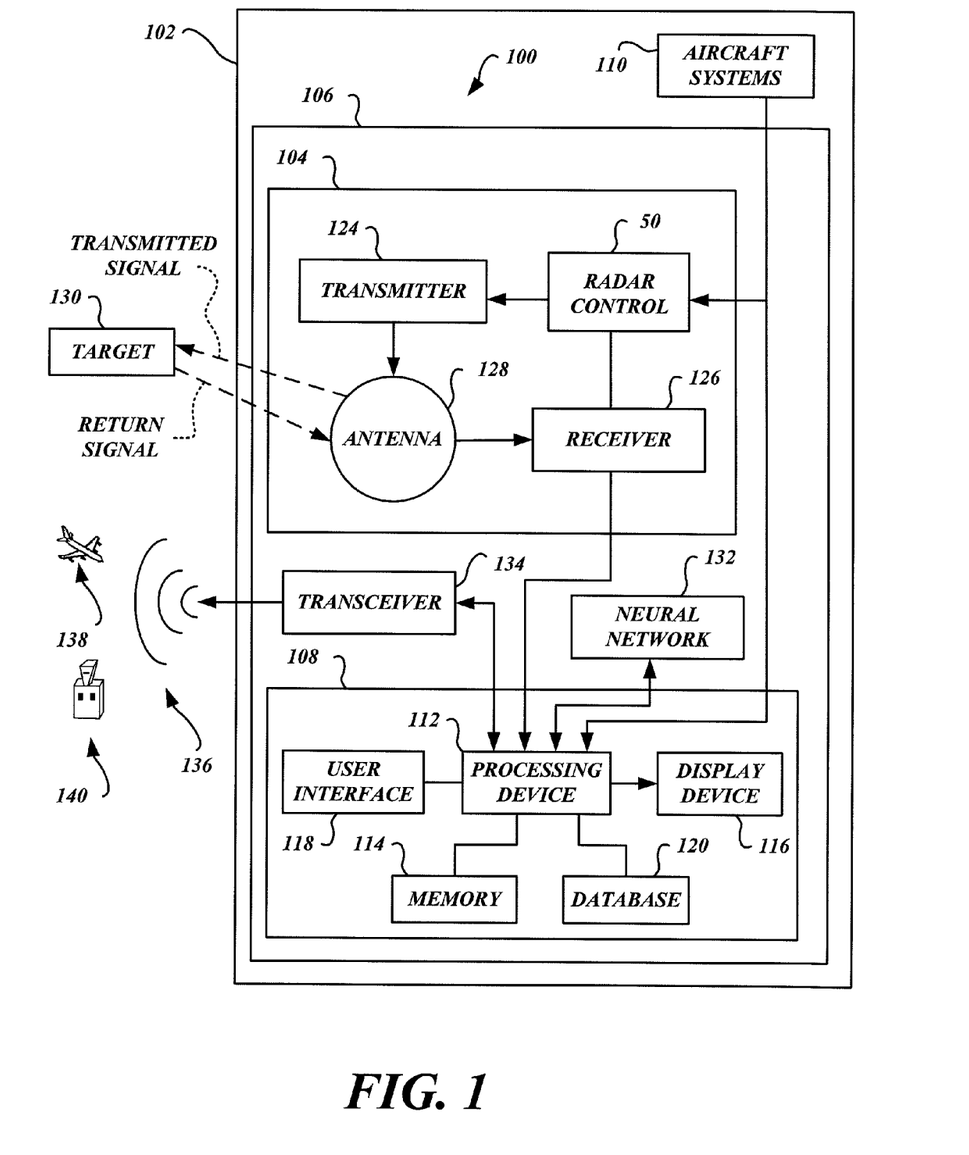
FIG. 1 is a block diagram of an embodiment of a weather data processing system.

FIG. 1 is a block diagram of an embodiment of a weather data processing system 100 residing in a craft 102, such as, but not limited to, an aircraft or maritime vessel. Embodiments of the weather data processing system 100 employ Gaussian decomposition to process the weather data received from a weather radar system 104. The Gaussian decomposition process facilitates weather radar picture smoothing and facilitates more efficient data linking for communicating the processed weather information to other aircraft and/or to ground stations. The picture-based weather data can be communicated over a relatively lower bandwidth communication channel or path. Prior art weather data communications systems have relatively larger bandwidth requirements that are necessary for communicating the relatively large amount of weather data and the rate at which the weather data can change.

A weather display system 106 includes a weather radar system 104 and a display/interface front-end 108. The weather display system 106 receives information from other aircraft systems 110, such as, but not limited to, accelerometers, global positioning systems (GPSs), and/or other sensor devices that sense various parameters in proximity to the craft 102 or various parameters relating to the craft 102, such as speed, direction, turbulence, altitude or the like.

The display/interface front-end 108 includes a processing device 112, a memory 114, a display device 116, a user interface 118, and an optional database 120. Any suitable processing device 112 may be used. In some embodiments, the processing device 112 is a special purpose processor system configured to process radar weather data received from the weather radar system 104. Alternatively, or additionally, the processing device 112 may perform other functionality.

The memory 114 is, in an exemplary embodiment, configured to serve as a working memory wherein logic for decomposing the received radar reflectivity data into multiple adaptive Gaussian component functions resides. The memory 114 may also store, either permanently or temporarily, the compressed weather radar display data that is generated based on the at least one selected parameter of the radar weather data.

The display device 116 is preferably a display device, such as a cathode ray tube, liquid crystal display, plasma screen, or other display device that presents weather information in graphical form to the crew of the craft 102. In some embodiments, the display device 116 may be configured to display the compressed weather radar display data for review and/or for verification by the crew or other viewers.

The user interface 118 is configured to receive input instructions from the crew of the craft 102. For example, the crew may instruct the processing device 112 to generate the compressed weather radar display data in a preferred format.

An example of the weather radar system 104 includes a radar controller 122 (configured to receive control instructions from the user interface 118), a transmitter 124, a receiver 126, and an antenna 128. The radar controller 122 controls the transmitter 124 and the receiver 126 for performing the sending and receiving of signals through the antenna 128. The weather radar system 104 and the display/interface front-end 108 are electronically and communicatively coupled to the other aircraft systems 110.

Radar relies on a transmission of a pulse of electromagnetic energy, referred to herein as a signal. The antenna 128 narrowly focuses the transmission of the signal pulse. Like the light from a flashlight, this narrow signal illuminates any objects in its path and illuminated objects reflect the electromagnetic energy back to the antenna 128.

Reflectivity data correspond to that portion of a radar's signal reflected back to the antenna 128 by liquids (e.g., rain) and/or frozen droplets (e.g., hail, sleet, and/or snow) residing in a weather object, such as a cloud or storm, or residing in areas proximate to the cloud or storm generating the liquids and/or frozen droplets.

The radar controller 122 calculates the distance of the weather object, such as an illustrated weather object 130, relative to the antenna 128 based upon the length of time the transmitted signal pulse takes in the transition from the antenna 128 to the weather object 130 and back to the antenna 128. The relationship between distance and time is linear as the velocity of the signal is constant, approximately the speed of light in a vacuum. Honeywell's® RDR-4000 airborne weather radar is a non limiting example weather radar that provides the radar reflectivity data and the short range Doppler radar information. Embodiments of the weather data processing system 100 may be implemented in any suitable weather radar system 104.

Additionally, an optional neural network 132 may be included that predicts turbulence data to forecast turbulence information beyond a 40 nautical mile (nm) range. Predicting turbulence information is based on the decomposed reflectivity data. In embodiments with the neural network 132, the database 120 may store information determined by the neural network 132 as it is trained. Additionally, or alternatively, the data base 120 may store the compressed weather radar display data.

The transceiver 134 is in signal communication with processing device 112 and is configured to receive the compressed weather radar display data from the processing device 112, and is configured to communicate a signal 136 from the craft 102 having the compressed weather radar display data therein. The signal may be received at another aircraft 138 and/or a ground station 140.

Figure 2A:
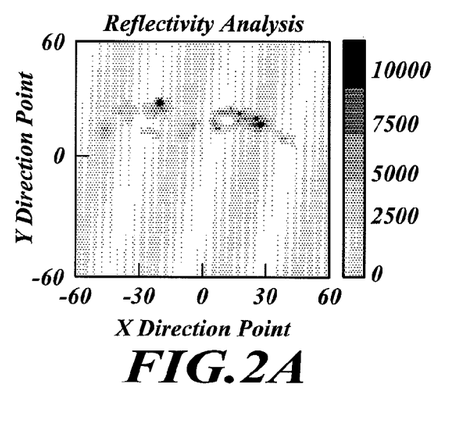
FIGS. 2A-2D illustrate near-range radar reflectivity and turbulence data.
Figure 2B:
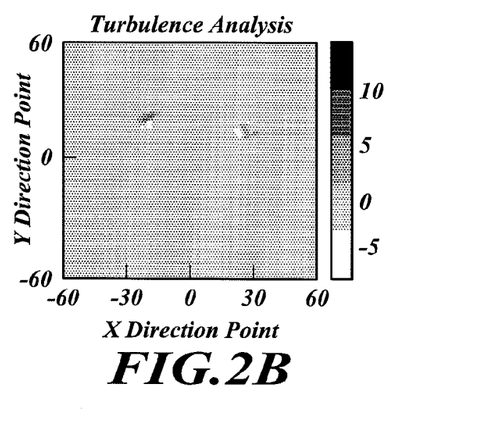
Figure 2C:
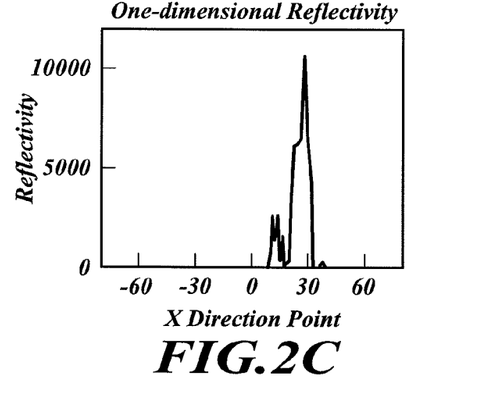
Figure 2D:
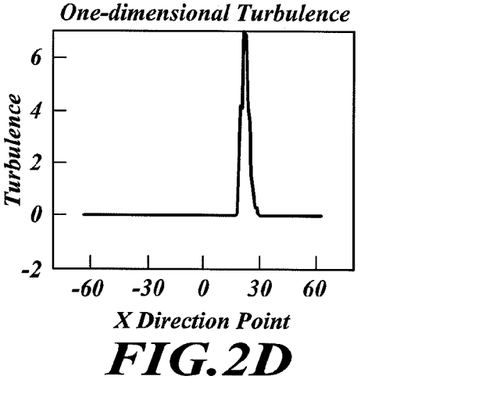

FIGS. 2A-D show actual radar reflectivity and turbulence data received and processed by the various embodiments. Although both reflectivity and turbulence data are three-dimensional, for visualization reasons, the data is presented in only one and two dimensions. FIGS. 2A and 2B show two-dimensional reflectivity and turbulence, respectively. FIGS. 2C and 2D show one-dimensional reflectivity and turbulence, respectively. From FIGS. 2C and 2D, it is observed that the reflectivity and turbulence data are all positive and look like the sum of multiple Gaussian functions.

In one embodiment, turbulence prediction systems and methods may use adaptive signal decomposition to reduce the amount of communicated weather data. Some embodiments may optionally employ a neural network's approach to forecast turbulence information beyond the 40 nm range. An exemplary method includes reflectivity signal decomposition and turbulence signal decomposition. The method decomposes the reflectivity data into multiple adaptive, three-dimensional Gaussian component functions, whose parameters, such as center position, amplitude, and dimensional standard deviations, are determined adaptively to maximally match the measured reflectivity. Performing the reflectivity signal decomposition includes using adaptive three-dimensional Gaussian base functions with unit energy. The turbulence data are decomposed into adaptive three-dimensional Gaussian base functions, with their parameters adjusted to maximally match the measured turbulence data.

With the decomposed reflectivity and turbulence components as input and output, backward propagation of the neural network is performed for learning the relationship between reflectivity and turbulence. The trained neural network is then used to predict the turbulence at an extended range where only reflectivity data are available. The adaptive signal decomposition method proposed herein may also be used for object tracking, e.g., weather/cloud tracking, bird flock tracking, aircraft tracking, etc.

Figure 3:
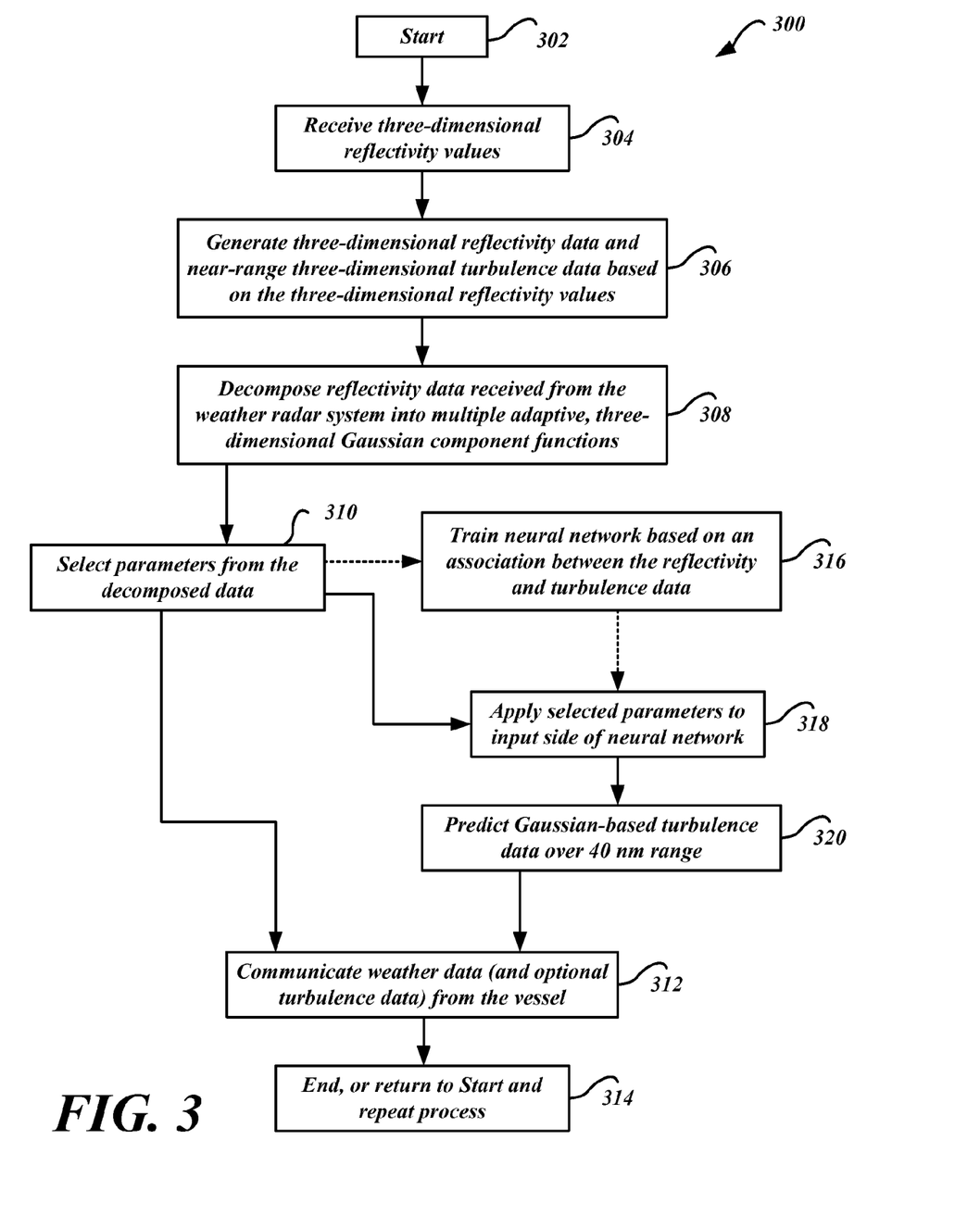
FIG. 3 illustrates an exemplary process for decomposing the reflectivity data received from the weather radar system into multiple adaptive, three-dimensional Gaussian component functions.

FIG. 3 illustrates an exemplary process 300 that decomposes the reflectivity data received from the weather radar system 104 (FIG. 1) into multiple adaptive, three-dimensional Gaussian component functions. The process starts at block 302. At block 304, three-dimensional reflectivity values are received from the weather radar system 104. At block 306, three-dimensional reflectivity data and near-range three-dimensional turbulence data based on the three-dimensional reflectivity values are generated. At block 308, a Gaussian decomposition of the three-dimensional reflectivity data and near-range three-dimensional turbulence data is performed. At block 310, parameters from the decomposed reflectivity data and the optional turbulence data are selected. These selected parameters are communicated from the craft 102 at block 312. At block 314, the process ends, or alternatively, returns to the start block 302 and repeats such that currently received radar data is processed and communicated.

As noted herein, some embodiments predict turbulence information beyond the 40 nm range using a neural network 132. In such embodiments, at the optional block 316, the neural network 132 is trained based on the received radar information by applying the selected parameters of an input side of the neural network 132. It is appreciated that this optional block may be bypassed after training of the neural network 132. At the optional block 318, parameters from the decomposed reflectivity data are selected. At the optional block 320, a Gaussian decomposition is performed on the predicted three-dimensional turbulence data. The process proceeds to block 312 such that the predicted turbulence information beyond the 40 nm range is communicated from the craft 102.

Figure 4:
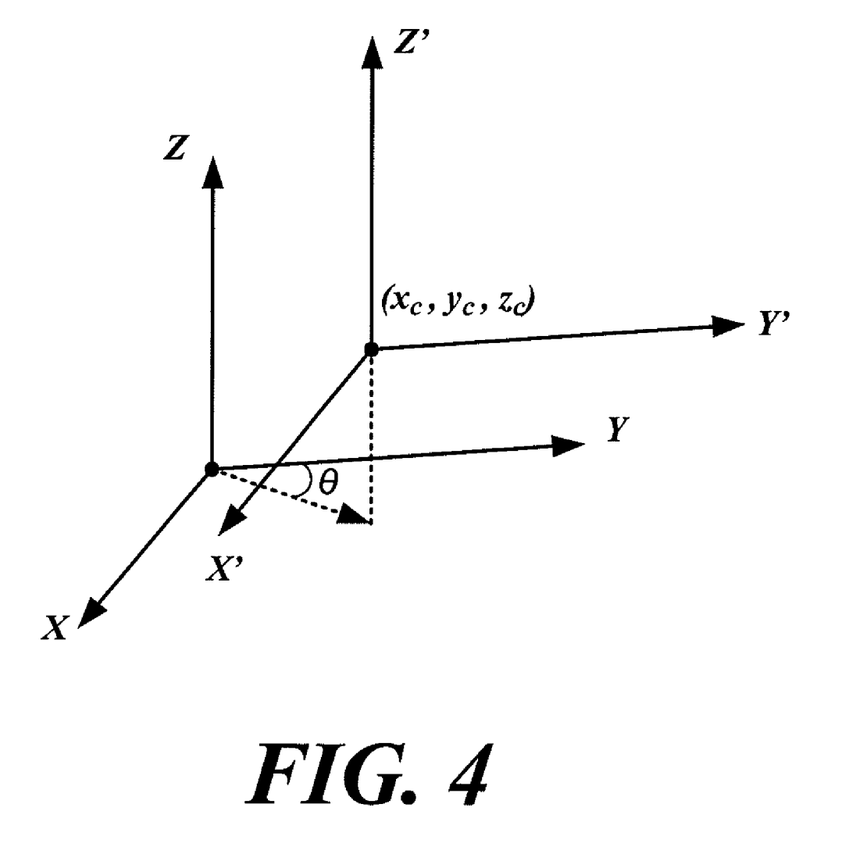
FIG. 4 illustrates a graphical manipulation used by the present invention for calculation improvement.

FIG. 4 shows that, for the convenience of computation, a coordinate change may be necessary and includes moving the origin of the xyz coordinates to point ($x_c$, $y_c$, $z_c$) and clockwise rotating the y coordinate θ results in new x'y'z' coordinates.

The new coordinates after coordinate change are calculated as:

$$\begin{cases} x' = (x - x_c)\cos\theta - (y - y_c)\sin\theta \\ y' = (x - x_c)\sin\theta + (y - y_c)\cos\theta \\ z' = z - z_c \end{cases} \quad (1)$$

The rotation angle θ is calculated as:

$$\theta = \arctan\left(\frac{x'_c}{y'_c}\right) \quad (2)$$

The transform from new coordinates back to old coordinates is:

$$\begin{cases} x = x'\cos\theta + y'\sin\theta + x_c \\ y = -x'\sin\theta + y'\cos\theta + y_c \\ z = z' + z_c \end{cases} \quad (3)$$

Adaptive Decomposition of Reflectivity: The following equations show the adaptive decomposition of reflectivity. The three-dimensional Gaussian base function is proposed, as follows:

$$f(x', y', z') = \frac{1}{(2\pi)^{3/4}\sqrt{\sigma_x\sigma_y\sigma_z}} \exp\left(-\frac{x'^2}{4\sigma_x^2} - \frac{y'^2}{4\sigma_y^2} - \frac{z'^2}{4\sigma_z^2}\right), \quad (4)$$

which has unit energy, i.e., $\iiint f^2(x', y', z')dx'dy'dz'=1$. Placing equation (1) into equation (4), the three-dimensional Gaussian base function in xyz coordinates is:

$$f(x, y, z) = \frac{1}{(2\pi)^{3/4}\sqrt{\sigma_x\sigma_y\sigma_z}} \exp\left(-\frac{[(x-x_c)\cos\theta - (y-y_c)\sin\theta]^2}{4\sigma_x^2} - \frac{[(x-x_c)\sin\theta + (y-y_c)\cos\theta]^2}{4\sigma_y^2} - \frac{(z-z_c)^2}{4\sigma_z^2}\right) \quad (5)$$

At initialization, the current reflectivity $r_1$ is set to the measured reflectivity data $r(x, y, z)$, i.e., $$r_1 = r(x,y,z) \quad (6)$$

The center position and dimensional deviations of the three-dimensional Gaussian base function are determined by solving the following optimization problem, where $\langle , \rangle$ means inner product.

$$\max_{f_1} |\langle r_1, f_1 \rangle|^2 \quad (7)$$

The amplitude of the Gaussian base function is calculated as:

$$A_{f1} = \langle r_1, f_1 \rangle \quad (8)$$

The first reflectivity component function $v_1$ is therefore:

$$v_1 = A_{f1} f_1 \quad (9)$$

Removing the first component function $v_1$ from the original reflectivity data $r_1$, a new reflectivity $r_2$ data is attained, i.e., $$r_2 = r_1 - A_{f1} f_1 \quad (10)$$

Repeating the above procedure for N iterations, there become N reflectivity component functions:

$$v_{kcom} \sim (A_{fk}, x_{cfk}, y_{cfk}, z_{cfk}, \sigma_{xfk}, \sigma_{yfk}, \sigma_{zfk}) \text{ for } k=1, \ldots, N \quad (11)$$

The real measured data $r(x, y, z)$ is:

$$r = \sum_{k=1}^{N} A_{fk} f_k + r_{N+1} \quad (12)$$

It is interesting to note that the residual of the adaptive decomposition is always bounded. For continuous signal $r$, the residual will be reduced to zero as the number of iterations N goes to infinity.

Ignoring the residual $r_{N+1}$, the N component functions are used to approximate the reflectivity function as:

$$\hat{r} = \sum_{k=1}^{N} A_{fk} f_k \quad (13)$$

Adaptive Decomposition of Turbulence: The following equations show the adaptive decomposition of turbulence. The turbulence base function is proposed, as follows:

$$p(x', y', z') = \frac{y'}{(2\pi)^{3/4}\sigma_y\sqrt{\sigma_x\sigma_y\sigma_z}} \exp\left(-\frac{x'^2}{4\sigma_x^2} - \frac{y'^2}{4\sigma_y^2} - \frac{z'^2}{4\sigma_z^2}\right) \quad (14)$$

This turbulence base function also has unit energy, i.e., $\iiint p^2(x', y', z')dx'dy'dz'=1$. Placing equation (1) into equation (14), the turbulence base function in xyz coordinates is represented as:

$$p(x, y, z) = \frac{(x-x_c)\sin\theta + (y-y_c)\cos\theta}{(2\pi)^{3/4}\sigma_y\sqrt{\sigma_x\sigma_y\sigma_z}} \exp\left(-\frac{[(x-x_c)\cos\theta - (y-y_c)\sin\theta]^2}{4\sigma_x^2} - \frac{[(x-x_c)\sin\theta + (y-y_c)\cos\theta]^2}{4\sigma_y^2} - \frac{(z-z_c)^2}{4\sigma_z^2}\right) \quad (15)$$

At initialization, the measured turbulence data $t(x, y, z)$ are assigned to the current turbulence $t_1$, i.e., $$t_1 = t(x,y,z) \quad (16)$$

The parameters of the turbulence base function are determined by solving the following optimization problem.

$$\max_{p_1} |\langle t_1, p_1 \rangle|^2 \quad (17)$$

The amplitude of the turbulence base function is calculated as:

$$A_{p1} = \langle t_1, p_1 \rangle \quad (18)$$

The first turbulence component function $u_0$ is:

$$u_1 = A_{p1} p_1 \quad (19)$$

Removing the first component function $u_1$ from the original turbulence data $t_1$, a new turbulence data $t_2$ is attained, i.e., $$t_2 = t_1 - A_{p1} p_1 \quad (20)$$

Repeating the above procedure for M iterations, M component functions are:

$$p_{kcom} \sim (A_{pk}, x_{cpk}, y_{cpk}, z_{cpk}, \sigma_{xpk}, \sigma_{ypk}, \sigma_{zpk}) \text{ for } k=1, \ldots, M \quad (21)$$

Ignoring the residual $t_{M+1}$, the M component functions are used to reconstruct the turbulence function as:

$$\hat{t} = \sum_{k=1}^{M} A_{pk} p_k \quad (22)$$

Upon receipt of the communicated information, the receiving aircraft and/or ground station re-generates the display data. In an exemplary embodiment, the display data is regenerated by using the communicated three-dimensional Gaussian parameters to generate the individual Gaussian functions based upon the above-described equation (15), and summing the Gaussian functions together. In embodiments that decomposes the display data using two-dimensional Gaussian parameters, the receiving aircraft and/or ground station re-generates the display data using two-dimensional Gaussian parameters.

Alternative embodiments decompose the reflectivity data received from the weather radar system 104 (FIG. 1) into multiple adaptive, two-dimensional Gaussian component functions. That is, an alternative method decomposes the reflectivity data into multiple adaptive, two-dimensional Gaussian component functions, whose parameters, such as center position, amplitude, and/or dimensional standard deviations, are determined adaptively to maximally match the measured reflectivity. Performing the reflectivity signal decomposition includes using adaptive two-dimensional Gaussian base functions with unit energy. The turbulence data may be decomposed into adaptive two-dimensional Gaussian base functions, with their parameters adjusted to maximally match the measured turbulence data.

While one embodiment has been illustrated and described, as noted above, many changes can be made without departing from the spirit and scope of the invention. For example, processors are used to automatically perform the steps shown and described in the flowcharts above. Accordingly, the scope of the disclosure is not limited by any particular disclosed embodiment. Instead, the various embodiments should be determined entirely by reference to the claims that follow.

The embodiments of the invention in which an exclusive property or privilege is claimed are defined as follows:

1. A method for transmitting compressed weather radar display data from a craft, the method comprising: at an electronic processor:
   receiving radar reflectivity data;
   decomposing the received radar reflectivity data into multiple adaptive Gaussian component functions;
   selecting at least one parameter from the decomposed Gaussian component functions;
   and generating the compressed weather radar display data based on the at least one selected parameter; and
   at a transceiver communicating the compressed weather radar display data from the craft.

2. The method of claim 1, wherein the compressed weather radar display data includes the decomposed Gaussian component functions.

3. The method of claim 2, further comprising:
   receiving the compressed weather radar display data from the craft at least one of a ground station and another aircraft;
   generating weather radar display data from the received compressed weather radar display data based upon the decomposed Gaussian component functions.

4. The method of claim 1, wherein decomposing the received radar reflectivity data into multiple adaptive Gaussian component functions is based upon a three-dimensional Gaussian base function defined by:

$$f(x', y', z') = \frac{1}{(2\pi)^{3/4}\sqrt{\sigma_x \sigma_y \sigma_z}} \exp\left(-\frac{x'^2}{4\sigma_x^2} - \frac{y'^2}{4\sigma_y^2} - \frac{z'^2}{4\sigma_z^2}\right).$$

5. The method of claim 1, wherein the received radar reflectivity data is three-dimensional radar reflectivity data, and further comprising:
   decomposing the received three-dimensional radar reflectivity data into multiple adaptive, three-dimensional Gaussian component functions.

6. The method of claim 5, wherein the received three-dimensional radar reflectivity data is near-term three-dimensional radar reflectivity data and far-term three-dimensional radar reflectivity data beyond 40 nautical miles (nm), and further comprising:
   determining weather data from the near-term three-dimensional radar reflectivity data and the far-term three-dimensional radar reflectivity data;
   decomposing the weather data into the multiple adaptive, three-dimensional Gaussian component weather information functions;
   determining turbulence data from the near-term three-dimensional radar reflectivity data;
   decomposing the turbulence data into multiple adaptive, three-dimensional Gaussian component weather information functions; and
   communicating the decomposed turbulence data.

7. The method of claim 6, wherein the received three-dimensional radar reflectivity data is near-term three-dimensional radar reflectivity data and far-term three-dimensional radar reflectivity data beyond 40 nautical miles (nm), and further comprising:
   training a neural network based on the received near-term three-dimensional radar reflectivity data and far-term three-dimensional radar reflectivity data;
   predicting turbulence data based on the received near-term three-dimensional radar reflectivity data at ranges greater than 40 nm using the neural network; and
   communicating the predicted turbulence data.

8. The method of claim 7, further comprising:
   decomposing the predicted turbulence data into the multiple adaptive, three-dimensional Gaussian component functions.

9. The method of claim 5, further comprising:
   selecting a plurality of parameters, wherein the plurality of parameters comprise a center position, an amplitude, and a dimensional standard deviation.

10. A system operable to transmit compressed weather radar display data from a craft, the system comprising:
    a weather radar system configured to generate radar reflectivity data from the craft out to ranges greater than 40 nautical miles (nm);
    a processing device in signal communication with the weather radar system, wherein the processing device is configured to receive the radar reflectivity data from the weather radar system, to decompose the received radar reflectivity data into multiple adaptive Gaussian component functions, to select at least one parameter from the decomposed multiple adaptive Gaussian component functions, to generate weather radar display data based on the at least one selected parameter; and
    a transceiver in signal communication with the processing device, wherein the transceiver is configured to receive the compressed weather radar display data from the processing device and to communicate the compressed weather radar display data from the craft.

11. The method of claim 10, wherein the compressed weather radar display data includes the multiple adaptive Gaussian component functions.

12. The system of claim 10, further comprising:
    a neural network,
    wherein the processing device is further configured to train the neural network to predict far-term turbulence information based on near-term radar reflectivity data used to determine near-term turbulence, and based on far-term radar reflectivity data, and wherein the predicted turbulence data is communicated from the craft.

13. The system of claim 12,
    wherein the processing device is further configured to:
    decompose radar reflectivity data at near-term distances into multiple adaptive, three-dimensional Gaussian component functions corresponding to weather information and turbulence information; and decompose the turbulence data at far-term distances into multiple adaptive, three-dimensional Gaussian component functions corresponding to weather information, and wherein the neural network predicts the turbulence information at the far-term distances based upon the determined far-term multiple adaptive, three-dimensional Gaussian component functions corresponding to the weather information.

14. The system of claim 13, wherein the near-term distances are less than 40 nm and the far-term distances are greater than 40 nm.

15. The system of claim 10, wherein the at least one selected parameter comprises one or more of a center position, an amplitude, and a dimensional standard deviation.

16. A system for transmitting compressed weather radar display data from a craft, the system comprising:

a means for receiving radar reflectivity data;

a means for decomposing the received radar reflectivity data into multiple adaptive Gaussian component functions, for selecting at least one parameter from the decomposed Gaussian component functions, and for generating the compressed weather radar display data based on the at least one selected parameter; and a means for communicating the compressed weather radar display data from the craft.

17. The system of claim 16, wherein the received radar reflectivity data is three-dimensional radar reflectivity data, and wherein the means for decomposing is configured to decompose the received three-dimensional radar reflectivity data into multiple adaptive, three-dimensional Gaussian component functions.

18. The system of claim 17, further comprising:

a neural network configured to select one or more first parameters from the multiple adaptive, three-dimensional Gaussian component functions; select one or more second parameters from the multiple adaptive, three-dimensional Gaussian component functions; apply the one or more first parameters to one of an input or output side of the neural network; and apply the one or more second parameters to a side of the neural network opposite the side with the applied first parameters.

19. The system of claim 18, wherein the parameters comprise one or more of a center position, an amplitude, and a dimensional standard deviation.

* * * * *

UNITED STATES PATENT AND TRADEMARK OFFICE
CERTIFICATE OF CORRECTION

| | | |
|---|---|---|
| PATENT NO. | : 8,144,048 B2 | Page 1 of 1 |
| APPLICATION NO. | : 12/731998 | |
| DATED | : March 27, 2012 | |
| INVENTOR(S) | : Brian P. Bunch et al. | |

It is certified that error appears in the above-identified patent and that said Letters Patent is hereby corrected as shown below:

In the Claims

Column 7, Line 42 (Claim 3): says "the craft at least", and should say --the craft at at least--

Signed and Sealed this
Fifteenth Day of April, 2014

Michelle K. Lee
*Deputy Director of the United States Patent and Trademark Office*